US010793125B2

(12) United States Patent
Okano et al.

(10) Patent No.: US 10,793,125 B2
(45) Date of Patent: Oct. 6, 2020

(54) VEHICLE BRAKING DEVICE

(71) Applicants: ADVICS CO., LTD., Kariya-shi, Aichi-ken (JP); TOYOTA JIDOSHA KABUSHIKI KAISHA, Toyota-shi, Aichi-ken (JP)

(72) Inventors: Takahiro Okano, Chiryu (JP); Daisuke Nakata, Seto (JP)

(73) Assignees: ADVICS CO., LTD., Kariya-Shi, Aichi-Ken (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 176 days.

(21) Appl. No.: 15/773,827

(22) PCT Filed: Nov. 25, 2016

(86) PCT No.: PCT/JP2016/085065
§ 371 (c)(1),
(2) Date: May 4, 2018

(87) PCT Pub. No.: WO2017/090755
PCT Pub. Date: Jun. 1, 2017

(65) Prior Publication Data
US 2018/0319383 A1 Nov. 8, 2018

(30) Foreign Application Priority Data

Nov. 27, 2015 (JP) .................................. 2015-231367

(51) Int. Cl.
*B60T 8/00* (2006.01)
*B60T 8/1755* (2006.01)
(Continued)

(52) U.S. Cl.
CPC .......... *B60T 8/17551* (2013.01); *B60T 7/042* (2013.01); *B60T 8/00* (2013.01); *B60T 8/17* (2013.01);
(Continued)

(58) Field of Classification Search
CPC ........ B60T 8/17551; B60T 7/042; B60T 8/00; B60T 8/17; B60T 8/172; B60T 13/146; B60T 13/662; B60T 13/686; B60H 1/00
(Continued)

(56) References Cited

U.S. PATENT DOCUMENTS

2011/0285198 A1 11/2011 Nakata et al.
2016/0347297 A1 12/2016 Ninoyu et al.
(Continued)

FOREIGN PATENT DOCUMENTS

JP 2005-035466 A 2/2005
JP 2006-137382 A 6/2006
(Continued)

OTHER PUBLICATIONS

International Search Report (PCT/ISA/210) dated Feb. 14, 2017, by the Japanese Patent Office as the International Searching Authority for International Application No. PCT/JP2016/085065.
(Continued)

*Primary Examiner* — Peter D Nolan
*Assistant Examiner* — Wae L Louie
(74) *Attorney, Agent, or Firm* — Buchanan Ingersoll & Rooney PC (57) ABSTRACT

The vehicle braking device performs a control which makes an actual value of physical quantity associated with a braking force follow a target value thereof when the actual value is outside a dead zone and a control which suppresses a change of the actual value when the actual value is within the dead zone and includes a judging portion which judges
(Continued)

whether or not the actual value passes through the dead zone with a value beyond the upper limit threshold value and a setting portion which sets a second upper limit threshold value more closely approximated than a first upper limit threshold value when the actual value is judged not to pass through the dead zone, as the upper limit threshold value, when the actual value is judged to pass through the dead zone by the judging portion.

7 Claims, 4 Drawing Sheets

(51) Int. Cl.
*B60T 7/04* (2006.01)
*B60T 13/66* (2006.01)
*B60T 13/68* (2006.01)
*B60T 8/17* (2006.01)
*B61H 1/00* (2006.01)
*B60T 13/14* (2006.01)
*B60T 8/40* (2006.01)
*B60T 8/172* (2006.01)

(52) U.S. Cl.
CPC ............ *B60T 8/172* (2013.01); *B60T 8/4077* (2013.01); *B60T 13/146* (2013.01); *B60T 13/662* (2013.01); *B60T 13/686* (2013.01); *B61H 1/00* (2013.01); *B60T 13/147* (2013.01); *B60T 2220/04* (2013.01)

(58) Field of Classification Search
USPC .......................................................... 701/78
See application file for complete search history.

(56) References Cited

U.S. PATENT DOCUMENTS

| | | | | |
|---|---|---|---|---|
| 2017/0225677 A1* | 8/2017 | Yoshida | ................ | B60W 30/18 |
| 2017/0334426 A1* | 11/2017 | Kato | .................... | B60W 50/06 |
| 2018/0015914 A1* | 1/2018 | Okano | .................. | B60T 13/686 |
| 2018/0065499 A1* | 3/2018 | Ogawa | ..................... | B60L 7/14 |
| 2018/0134274 A1* | 5/2018 | Ogawa | .................. | B60W 10/06 |
| 2018/0141527 A1* | 5/2018 | Hara | .................. | B60T 8/17551 |
| 2018/0194333 A1* | 7/2018 | Nishikawa | .............. | B60T 8/171 |
| 2018/0201245 A1* | 7/2018 | Kamiya | .................... | B60T 8/00 |
| 2018/0319383 A1* | 11/2018 | Okano | ....................... | B60T 8/00 |
| 2019/0016317 A1* | 1/2019 | Masuda | .................... | B60T 8/17 |
| 2019/0155293 A1* | 5/2019 | Oniwa | .............. | B60W 60/0021 |
| 2019/0193572 A1* | 6/2019 | Nakata | .................. | B60T 13/586 |

FOREIGN PATENT DOCUMENTS

| | | |
|---|---|---|
| JP | 2009-40376 A | 2/2009 |
| JP | 2013-111998 A | 6/2013 |
| JP | 2015-143060 A | 8/2015 |

OTHER PUBLICATIONS

Written Opinion (PCT/ISA/237) dated Feb. 14, 2017, by the Japanese Patent Office as the International Searching Authority for International Application No. PCT/JP2016/085065.

* cited by examiner

VEHICLE BRAKING DEVICE

TECHNICAL FIELD

This invention relates to a vehicle braking device.

BACKGROUND ART

One type of a vehicle braking device has been known for example, in the Patent Literature 1. In the vehicle braking device shown in FIG. 1 of the Patent Literature 1, a feed-forward control and a feed-back control for a linear valve are executed so that the control hydraulic pressure Pwc which corresponds to the wheel cylinder pressure of each vehicle wheel becomes the target hydraulic pressure Pref. According to the vehicle braking device, a width of hydraulic pressure defined by the lower limit pressure Pl and the upper limit pressure Pu with respect to the center of the target hydraulic pressure Pref is set as a dead zone. When the control hydraulic pressure Pwc is within the dead zone, no pressure decreasing operation or increasing operation is performed and as a holding mode, the pressure is controlled to close the linear valve. Further, according to the vehicle braking device, when the control hydraulic pressure Pwc is below the lower limit Pl of the dead zone, the pressure increasing valve is opened to increase the control hydraulic pressure Pwc (pressure increasing mode). Oppositely, when the control hydraulic pressure Pwc is over the upper limit Pu of the dead zone, the pressure decreasing valve is opened to decrease the control hydraulic pressure Pwc (pressure decreasing mode).

CITATION LIST

Patent Literature

[Patent Literature 1] JP2005/035466 A

SUMMARY OF INVENTION

Technical Problem(s)

The vehicle braking device according to the Patent literature 1 as listed above performs the above control always based on the deviation in pressure between the target hydraulic pressure Pref and the control hydraulic pressure Pwc. Accordingly, the control hydraulic pressure Pwc easily enters in the dead zone. As a result, repetition between the holding operation and the pressure increasing or decreasing operation of the control hydraulic pressure Pwc occurs frequently, which may lead to a stepwise change of the control hydraulic pressure Pwc. Particularly, when the target hydraulic pressure Pref changes relatively gradually, the driver of the vehicle may feel an uncomfortable feeling in stepwise changing of deceleration.

Accordingly, this invention was made in consideration with the above-mentioned situation and the invention pertains to provide a vehicle braking device which can suppress generation of an uncomfortable feeling of a driver of a vehicle during braking operation.

Solution to Problem(s)

In order to solve the above problems, the vehicle braking device according to the invention of claim 1 performs a following control which makes an actual value of physical quantity which is associated with a braking force to be applied to a vehicle wheel follow a target value of the physical quantity when the actual value is a value outside a dead zone and a suppression control which suppresses a change of the actual value when the actual value is a value within the dead zone in order to control the physical quantity to be the target value of the physical quantity, assuming that the dead zone is defined to be a value between a lower limit threshold value which is smaller than the target value and an upper limit threshold value which is greater than the target value. The vehicle braking device includes a judging portion which judges whether or not the actual value passes through the dead zone with a value beyond the upper limit threshold value while the target value is increasing and a setting portion which sets a second upper limit threshold value which is approximated to the target value more closely than a first upper limit threshold value which is the upper limit threshold value set when the actual value is judged not to pass through the dead zone by the judging portion, as the upper limit threshold value, when the actual value is judged to pass through the dead zone by the judging portion.

Effect of Invention

According to the vehicle braking device of the invention sets the second upper limit threshold value which is approximated to the target value more closely than a first upper limit threshold value which is the upper limit threshold value set when the actual value is judged not to pass through the dead zone by the judging portion, as the upper limit threshold value, when the target value is increasing and the actual value is judged to pass through the dead zone with the value beyond the upper limit threshold value by the judging portion. Therefore, comparing the case that the actual value is judged not to pass the dead zone, the decreasing of the actual value starts in an early stage to suppress the stepwise change of the actual value. Accordingly, the vehicle braking device which can suppress generation of an uncomfortable feeling of a driver of a vehicle during braking operation can be proposed.

EMBODIMENTS FOR IMPLEMENTING INVENTION

Figure 1:
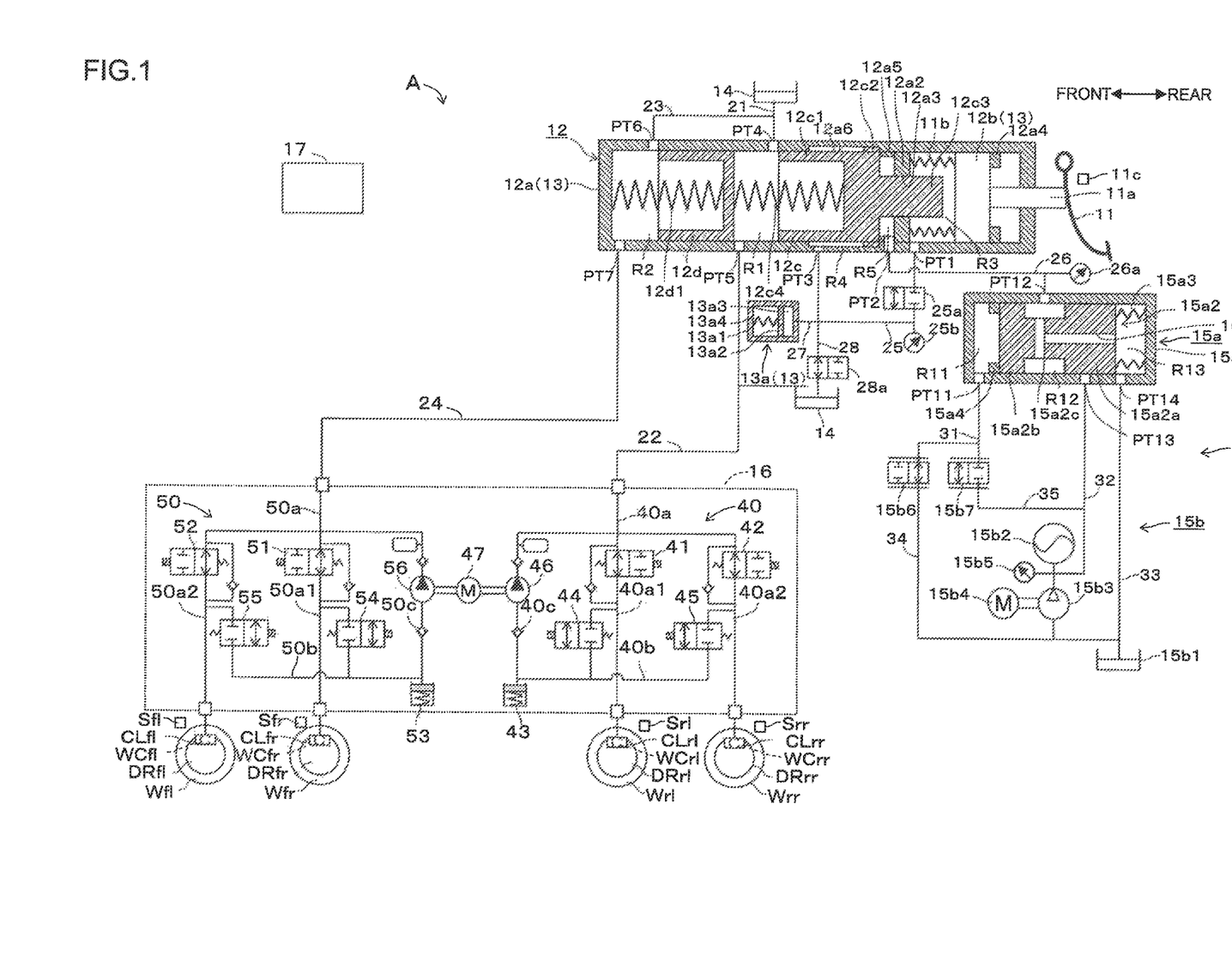
FIG. 1 is an outline schematic view of a vehicle braking device according to one embodiment of the invention.

The embodiment of the vehicle braking device according to one embodiment of the invention adapted to a vehicle will be explained hereinafter with reference to the attached drawings. The vehicle is equipped with a hydraulic pressure generating device A (vehicle braking device) which applies brakes to the vehicle by applying the hydraulic pressure braking force to directly to each vehicle wheel Wfl, Wfr, Wrl and Wrr. The hydraulic pressure braking force generating device A includes a brake pedal 11 which corresponds to a brake operating member, a master cylinder 12, a stroke simulator portion 13, a reservoir 14, a booster mechanism 15 (hydraulic pressure generating device), an actuator 16 (brake hydraulic pressure adjusting device) and a wheel cylinder WC, as shown in FIG. 1. The hydraulic pressure braking force generating device A corresponds to the vehicle braking device.

The wheel cylinder WC restricts the rotation of the respective wheels W and is disposed in the caliper CL. The wheel cylinder WC serves as a braking force applying mechanism which applies braking force to the wheels W of the vehicle based on the pressure of the brake fluid (brake hydraulic pressure) from the actuator 16. When the brake hydraulic pressure is supplied to the wheel cylinder WC, each piston (not shown) in each wheel cylinder WC pushes a pair of brake pads (not shown) which serves as a friction member and squeezes a disc rotor DR which serves as a rotational member rotating unitary with the wheel W from both sides thereof to thereby restrict the rotation of the rotor DR. It is noted here that in this embodiment, a disc type brake device is used but a drum type brake device may be used. The wheel W means either one of the right/left front/rear wheels Wfr, Wfl, Wrr and Wrl.

The brake pedal 11 is connected to the stroke simulator portion 13 and the master cylinder 12 via an operation rod 11a.

A pedal stroke sensor 11c (hereinafter referred to also simply as "stroke sensor") which detects a brake pedal stroke (operation amount: hereinafter referred to simply as "stroke") which corresponds to a braking operation state by depression of the brake pedal 11 is provided in the vicinity of the brake pedal 11. The brake ECU 17 is connected to this stroke sensor 11c and the detected signal (detection result) from the stroke sensor 11c is outputted to the brake ECU 17.

The master cylinder 12 supplies the actuator 16 with the brake fluid in response to the operation amount of the brake pedal 11 (brake operating member) and is formed by a cylinder body 12a, an input piston 12b, a first master piston 12c and a second master piston 12d, etc.

The cylinder body 12a is formed in a substantially bottomed cylinder shape housing having a bottom surface closed. The cylinder body 12a includes therein a partition wall portion 12a2 which extends inwardly with a shape of flange at the inner peripheral side of the cylinder body 12a. An inner circumferential surface of the partition wall portion 12a2 is provided with a through hole 12a3 at a central portion thereof, penetrating through the partition wall portion 12a2 in front and rearward direction. The cylinder body 12a is provided with a first master piston 12c and a second master piston 12d at an inner peripheral portion thereof at a portion further front side than the partition wall portion 12a2. The first and the second master pistons 12c and 12d are liquid-tightly movable in an axial direction in the cylinder body 12a.

The cylinder body 12a is provided with an input piston 12b at an inner peripheral portion thereof at a portion further rear side than the partition wall portion 12a2. The input piston 12b is liquid-tightly movable in an axial direction in the cylinder body 12a. The input piston 12b slidably moves within the cylinder body 12a in response to the operation of the brake pedal 11.

The operating rod 11a which is operable in association with the brake pedal 11 is connected to the input piston 12b. The input piston 12b is biased in a direction where the volume of the first hydraulic pressure chamber R3 expands, i.e., in a rearward direction (right/left direction as viewed in the drawing) by means of a compression spring 11b. When the brake pedal 11 is depressed, the operating rod 11a advances forward overcoming the biasing force of the compression spring 11b. By this advance movement of the operating rod 11a, the input piston 12b advances in association with the movement of the operating rod 11a. When the depression operation of the brake pedal 11 is released, the input piston 12b retreats by the biasing force of the compression spring 11b and is brought into contact with a restriction projecting portion 12a4 for positioning.

The first master piston 12c includes a pressurizing cylindrical portion 12c1, a flange portion 12c2 and a projecting portion 12c3 in order from the front and these portions are formed integrally as a unit. The pressurizing cylindrical portion 12c1 is formed in a substantially bottomed cylinder shape having an opening at a front portion thereof and a bottom wall at a rear portion thereof. The pressurizing cylindrical portion 12c1 is liquid-tightly movably provided in the inner peripheral surface of the cylinder body 12a. A coil spring-shaped biasing member 12c4 is provided in the inner space of the pressurizing cylindrical portion 12c1 between the first master piston 12c and the second master piston 12d. The first master piston 12c is biased in a rear direction by the coil spring 12c4. In other words, the first master piston 12c is biased by the coil spring 12c4 in a rearward direction and is finally brought into contact with a restriction projecting portion 12a5 for positioning. This position is defined to be the initial position (predetermined position) at the time the depression operation of the brake pedal 11 is released.

The flange portion 12c2 is formed to have a greater diameter than the diameter of the pressurizing cylindrical portion 12c1 and is liquid-tightly and slidably disposed on an inner peripheral surface of a large diameter portion 12a6 in the cylinder body 12a. The projecting portion 12c3 is formed to have a smaller diameter than the diameter of the pressurizing cylindrical portion 12c1 and is slidably in liquid-tightly provided on the through hole 12a3 of the partition wall portion 12a2. The rear end of the projecting portion 12c3 projects into an inner space of the cylinder body 12a, passing through the through hole 12a3 and is separated from the inner peripheral surface of the cylinder body 12a. The rear end surface of the projecting portion 12c3 is separated from the bottom wall (front end surface) of the input piston 12b and the separation distance is formed to be variable.

The second master piston 12d is arranged in the cylinder body 12a at a front side relative to the first master piston 12c. The second master piston 12d is formed in a substantially bottomed cylinder shape having an opening at a front portion thereof. A coil spring 12d1 which serves as a biasing member is disposed in the inner space of the second master piston 12d between the second piston 12d and a closed inner bottom surface of the cylinder body 12a. The second master piston 12d is biased by the coil spring 12d1 in a rearward direction. In other words, the second master piston 12d is biased by the coil spring 12d1 towards a predetermined initial position.

The master cylinder 12 is formed by a first master chamber R1, a second master chamber R2, a first hydraulic pressure chamber R3, a second hydraulic pressure chamber R4 and a servo chamber (driving hydraulic pressure chamber) R5.

The first master chamber R1 is defined by the inner peripheral surface of the cylinder body 12a, the first master piston 12c (front side of the pressurizing cylindrical portion 12c1) and the second master piston 12d. The first master chamber R1 is connected to the reservoir 14 via the hydraulic passage 21 which is connected to the port PT4. Further, the first master chamber R1 is connected to the hydraulic passage 40a (actuator 16) via the hydraulic passage 22 which is connected to the port PT5.

The second master chamber R2 is defined by the inner peripheral surface of the cylinder body 12a and the front side of the second master piston 12d. The second master chamber R2 is connected to the reservoir 14 via the hydraulic passage 23 which is connected to the port PT6. Further, the second master chamber R2 is connected to the hydraulic passage 50a (actuator 16) via the hydraulic passage 24 which is connected to the port PT7.

The first hydraulic pressure chamber R3 is formed between the partition wall portion 12a2 and the input piston 12b and is defined by the inner peripheral surface of the cylinder body 12a, the partition wall portion 12a2, the projecting portion 12c3 of the first master piston 12c and the input piston 12b. The second hydraulic pressure chamber R4 is formed at the side of the pressurizing cylindrical portion 12c1 of the first master piston 12c and is defined by the large diameter portion 12a6 of the cylinder body 12a, the pressurizing cylindrical portion 12c1 and the flange portion 12c2. The first hydraulic pressure chamber R3 is connected to the second hydraulic pressure chamber R4 via the hydraulic passage 25 which is connected to the port PT1 and the port PT3.

The servo chamber R5 is formed between the partition wall portion 12a2 and the pressurizing cylindrical portion 12c1 of the first master piston 12c and is defined by the inner peripheral surface of the cylinder body 12a, the partition wall portion 12a2, the projecting portion 12c3 of the first master piston 12c and the pressurizing cylindrical portion 12c1. The servo chamber R5 is connected to the output chamber R12 via the hydraulic passage 26 which is connected to the port PT2. The servo chamber R5 corresponds to the hydraulic pressure chamber defined in the appended claims.

The pressure sensor 26a is a sensor that detects the servo pressure (driving hydraulic pressure) which is supplied to the servo chamber R5 and is connected to the hydraulic passage 26. The pressure sensor 26a sends the detection signal (detection result) to the brake ECU 17. It is noted here that this servo pressure corresponds to the hydraulic pressure in the hydraulic pressure chamber and also the physical quantity associated with the braking force applied to the vehicle wheel respectively defined in the appended claims. It is also noted that the physical quantity is not limited to this servo pressure and the wheel cylinder pressure or the master cylinder pressure may be included as the physical quantity.

The stroke simulator portion 13 is formed by the cylinder body 12a, the input piston 12b, the first hydraulic pressure chamber R3 and a stroke simulator 13a which is in fluid communication with the first hydraulic pressure chamber R3.

The first hydraulic pressure chamber R3 is in fluid communication with the stroke simulator 13a via the hydraulic passages 25 and 27 which are connected to the port PT1. It is noted that the first hydraulic pressure chamber R3 is in fluid communication with the reservoir 14 via a connection passage (not shown).

The stroke simulator 13a generates a stroke (reaction force) which magnitude depends on the operation state of the brake pedal 11. The stroke simulator 13a is formed by a cylindrical portion 13a1, a piston portion 13a2, a reaction force hydraulic pressure chamber 13a3 and a spring 13a4. The piston portion 13a2 liquid-tightly slidably moves within the cylindrical portion 13a1 in response to the braking operation by the brake pedal 11. The reaction force hydraulic pressure chamber 13a3 is formed between and defined by the cylindrical portion 13a1 and the piston portion 13a2. The reaction force hydraulic pressure chamber 13a3 is in fluid communication with the first hydraulic pressure chamber R3 and the second hydraulic pressure chamber R4 via the hydraulic passages 27 and 25. The spring 13a4 biases the piston portion 13a2 in a direction where the volume of the reaction force hydraulic pressure chamber 13a3 decreases.

It is noted that the first control valve 25a which is a normally closed type electromagnetic valve is disposed in the hydraulic passage 25. The second control valve 28a which is a normally open type electromagnetic valve is disposed in the hydraulic passage 28 which connects the hydraulic passage 25 and the reservoir 14. When the first control valve 25a is in a closed state, the fluid communication between the first and the second hydraulic pressure chambers R3 and R4 is interrupted. This fluid communication interruption keeps the constant separation distance between the input piston 12b and the first master piston 12c to allow the coordinative movement therebetween. Further, when the first control valve 25a is in an open state, the fluid communication between the first hydraulic pressure chamber R3 and the second hydraulic pressure chamber R4 is established. Thus, the volume change of the first and the second hydraulic pressure chambers R3 and R4 caused by the advance or retreat movement of the first master piston 12c can be absorbed by the transfer of the brake fluid.

The pressure sensor 25b is a sensor that detects the reaction force hydraulic pressure in the second hydraulic pressure chamber R4 and the first hydraulic pressure chamber R3 and is connected to the hydraulic passage 25. The pressure sensor 25b detects the pressure in the second hydraulic pressure chamber R4 when the first control valve 25a is in a closed state and also detects the pressure (or the reaction force hydraulic pressure) in the first hydraulic pressure chamber R3 which is in fluid communication with the second hydraulic pressure chamber R4 when the first control valve 25a is in an open state. The pressure sensor 25b sends the detected signal (detection result) to the brake ECU 17.

The booster mechanism 15 generates a servo pressure in response to the operation amount of the brake pedal 11. The booster mechanism 15 includes a regulator 15a and a pressure supply device 15b.

The regulator 15a is configured to have a cylinder body 15a1 and a spool 15a2 which slides in the cylinder body 15a1. a pilot chamber R11, an output chamber R12 and a hydraulic pressure chamber R13 are provided in the regulator 15a.

The pilot chamber R11 is defined by the cylinder body 15a1 and a front end surface of a second large diameter portion 15a2b of the spool 15a2. The pilot chamber R11 is connected to the pressure decreasing valve 15b6 and the pressure increasing valve 15b7 (hydraulic passage 31) which are connected to the port PT11. A restriction projecting portion 15a4 is provided on the inner peripheral surface of the cylinder body 15a1 to position the spool 15a2 by contacting the second large diameter portion 15a2b with the restriction projecting portion 15a4.

The output chamber R12 is defined by the cylinder body 15a1 and the small diameter portion 15a2c of the spool 15a2, the rear end surface of the second large diameter portion 15a2b and the front end surface of the first large diameter portion 15a2a. The output chamber R12 is connected to the servo chamber R5 of the master cylinder 12 via the hydraulic passage 26 which is connected to the port PT12 and the port PT2. Further, the output chamber R12 is connectible with the accumulator 15b2 via the hydraulic passage 32 which is connected to the port PT13.

The hydraulic pressure chamber R13 is defined by the cylinder body 15a1 and the rear end surface of the first large diameter portion 15a2a of the spool 15a2. The hydraulic pressure chamber R13 is connectible with the reservoir 15b1 via the hydraulic passage 33 which is connected to the port PT14. A spring 15a3, which biases the spool 15a2 in a direction where the volume of the hydraulic pressure chamber R13 increases, is disposed in the hydraulic pressure chamber R13.

The spool 15a2 is formed by the first large diameter portion 15a2a, the second large diameter portion 15a2b and the small diameter portion 15a2c. The first large diameter portion 15a2a and the second large diameter portion 15a2b are structured to be liquid-tightly movable within the cylinder body 15a1. The small diameter portion 15a2c is arranged between the first large diameter portion 15a2a and the second large diameter portion 15a2b and is formed integrally therewith as a unit. The small diameter portion 15a2c is formed to have a diameter smaller than the first large diameter portion 15a2a and the second large diameter portion 15a2b. Further, a communication passage 15a5 which connects the output chamber R12 and the hydraulic pressure chamber R13 is formed in the spool 15a2.

The pressure supply device 15b also serves as a drive portion which drives the spool 15a2. The pressure supply device 15b includes a reservoir 15b1 which is a low pressure source, an accumulator 15b2 which is a high pressure source that accumulates the brake fluid, a pump 15b3 which pumps the brake fluid from the reservoir 15b1 into the accumulator 15b2 and an electric motor 15b4 which drives the pump 15b3. The reservoir 15b1 is exposed to the atmospheric pressure and the hydraulic pressure in the reservoir 15b1 is the same level with the atmospheric pressure. The pressure in the low pressure source is lower than the pressure in the high pressure source. The pressure supply device 15b is provided with a pressure sensor 15b5 which detects the pressure of the brake fluid supplied from the accumulator 15b2 and outputs the detected result to the brake ECU 17.

Further, the pressure supply device 15b is provided with a pressure decreasing valve 15b6 and a pressure increasing valve 15b7. The pressure decreasing valve 15b6 is provided between the servo chamber R5 and the output chamber R12 (hydraulic pressure chamber) and a reservoir 15b1 (low pressure source) which pressure is lower than the accumulator 15b2 as the high pressure source and is configured to be a pressure decreasing electromagnetic valve which adjusts the flow-rate of the brake fluid flowing into the reservoir 15b1 from the servo chamber R5 and the output chamber R12. The pressure decreasing valve 15b6 is a normally open type electromagnetic valve which opens in a non-energized state. The flow-rate of the pressure decreasing valve 15b6 is linearly controlled by the instructions from the brake ECU 17. The pressure decreasing valve 15b6 becomes in a fluid communicable state when the control current of the solenoid coil equipped in the pressure decreasing valve 15b6 becomes zero (at non-energized state). By adjusting the control current therethrough, the cross-sectional area of the flow passage can be adjusted to adjust the flow-rate of the pressure decreasing valve 15b6. One side of the pressure decreasing valve 15b6 is connected to the pilot chamber R11 via the hydraulic passage 31 and the other side thereof is connected to the reservoir 15b1 via the hydraulic passage 34.

The pressure increasing valve 15b7 is provided between the servo chamber R5 and the output chamber R12 (hydraulic pressure chamber) and the accumulator 15b2 which is the high pressure source and is a pressure increasing electromagnetic valve which adjusts the flow-rate of the brake fluid flowing into the servo chamber R5 and the output chamber R12 from the accumulator 15b2. The pressure increasing valve 15b7 is a normally closed type electromagnetic valve which closes in a non-energized state. The flow-rate of the pressure increasing valve 15b7 is controlled by the instructions from the brake ECU 17. The pressure increasing valve 15b7 becomes in a fluid interrupted state when the control current of the solenoid coil equipped in the pressure increasing valve 15b7 becomes zero (at non-energized state). By adjusting the control current therethrough, the cross-sectional area of the flow passage can be adjusted to adjust the flow-rate of the pressure increasing valve 15b7. One side of the pressure increasing valve 15b7 is connected to the pilot chamber R11 via the hydraulic passage 31 and the other side thereof is connected to the accumulator 15b2 via the hydraulic passage 35 and the hydraulic passage 32 to which the hydraulic passage 35 is connected.

The operation of the regulator 15a will be explained briefly hereinafter. In the case where the pilot pressure is not supplied to the pilot chamber R11 from the pressure decreasing valve 15b6 and the pressure increasing valve 15b7, the spool 15a2 is positioned at the initial position by means of a biasing force of the spring 15a3 (See FIG. 1). The initial position of the spool 15a2 is determined by the contact of the front end surface of the spool 15a2 with the restriction projecting portion 15a4. This initial position is the position immediately before the rear end surface of the spool 15a2 closes the port PT14.

As explained, when the spool 15a2 is in the initial position, the port PT14 and the port PT12 are in fluid communication with each other through the communication passage 15a5 and at the same time the port PT13 is closed by the spool 15a2.

In the case where the pilot pressure formed by the pressure decreasing valve 15b6 and the pressure increasing valve 15b7 increases in response to the brake pedal 11 operation, the spool 15a2 moves in a rearward direction (right side in FIG. 1), overcoming the biasing force of the spring 15a3. The spool 15a2 moves to the position where the port PT13 is open. Then, the port PT14 which has been in the open state, is closed by the spool 15a2. (Pressure increasing operation).

By the force balance between the pushing force at the front end surface of the second large diameter portion 15a2b2 of the spool 15a2 and the force corresponding to the servo pressure, the position of the spool 15a2 is fixed. This position of the spool 15a2 is defined to be the "holding position". The port PT13 and the port PT14 are closed by the spool 15a2. (Holding operation).

In the case where the pilot pressure formed by the pressure decreasing valve 15b6 and the pressure increasing valve 15b7 decreases in response to the brake pedal 11 operation, the spool 15a2 which is in the holding position now moves in a frontward direction by the biasing force of the spring 15a3. Then, the port PT13 which has been in the closed state by the spool 15a2 keeps the closed state. The port PT14 which has been in the closed state is open. Under this state, the port PT14 and the port PT12 are in fluid communication with each other through the communication passage 15a5 (Pressure decreasing operation).

The actuator 16 is a device which adjusts the brake hydraulic pressure to be applied to each wheel cylinder WC and a first conduit system 40 and a second conduit system 50 are provided as a dual brake system. The first conduit system 40 controls the brake hydraulic pressure to be applied to the left rear wheel Wrl and the right rear wheel Wrr and the second conduit system 50 controls brake hydraulic pressure applied to the right front wheel Wfr and the left front wheel Wfl. In other words, the conduit system is a front/rear conduit brake system.

The hydraulic pressure supplied from the master cylinder 12 is transmitted to the respective wheel cylinders WCrl, WCrr, WCfr and WCfl through the conduit systems 40 and 50. In the first conduit system, the hydraulic passage 40a is disposed which connects the hydraulic passage 22 and the wheel cylinders WCrl, WCrr and in the second conduit system 50, the hydraulic passage 50a is disposed which connects the hydraulic passage 24 and the wheel cylinders WCfr, WCfl. Through these hydraulic passages 40a and 50a, the hydraulic pressure supplied from the master cylinder 12 is transmitted to the wheel cylinders WCrl, WCrr, WCfr and WCfl.

The hydraulic passages 40a and 50a are branched to two passages, 40a1 and 40a2 and 50a1 and 50a2, respectively. In the branched hydraulic passages 40a1 and 50a1, the first pressure increasing control valves 41 and 51 which control increasing of the brake hydraulic pressure to the wheel cylinders WCrl and WCfr are disposed respectively and in the branched hydraulic passages 40a2 and 50a2, the second pressure increasing valves 42 and 52 which control increasing of the brake hydraulic pressure to the wheel cylinders WCrr and WCfl, are disposed respectively.

These first pressure increasing valves 41, 42 and the second pressure increasing valves 51, 52 are formed by a two-position electromagnetic valve which can control the valve state to the communication state and the interrupted state. The first pressure increasing valves 41, 42 and the second pressure increasing valves 51, 52 are formed by a normally open type valve which controls the valve state such that when the control current to the solenoid coil provided in the first pressure increasing valves 41, 42 and the second pressure increasing valves 51, 52 is zero value (non-energized state), the valve becomes in a fluid communication state and when the control current to the solenoid coil flows (energized state), the valve becomes in a fluid interrupted state.

The passage portions between the first and the second pressure increasing valves 41, 42 and 51, 52 and the wheel cylinders WCrl, WCrr and WCfr, WCfl in the hydraulic passages 40a, 50a are connected to the reservoirs 43, 53 via the hydraulic passage 40b, 50b, respectively. The first pressure decreasing control valves 44, 45 and the second pressure decreasing control valves 54, 55 which are formed by a two-position electromagnetic valve which can control the valve state to the communication state and the interrupted state, are disposed in the hydraulic passages 40b, 50b, respectively. The first pressure decreasing valves 44, 45 and the second pressure decreasing valves 54, 55 are formed by a normally closed type valve which controls the valve state such that when the control current to the solenoid coil provided in the first pressure decreasing valves 44, 45 and the second pressure decreasing valves 54, 55 is zero value (non-energized state), the valve becomes in a fluid interrupted state and when the control current to the solenoid coil flows (energized state), the valve becomes in a fluid communication state.

The hydraulic passages 40c and 50c, which are the return hydraulic passages, are provided between the reservoirs 43, 53 and the main hydraulic passages 40a, 50a. The pumps 46 and 56 driven by the motor 47 are disposed in the hydraulic passages 40c and 50c for suctioning or discharging the brake fluid from the reservoirs 43, 53 towards the master cylinder 12 side or the wheel cylinders WCrl, WCrr and WCfr, WCfl side.

The pumps 46, 56 suctions the brake fluid from the reservoirs 43, 53 and discharges the same to the hydraulic passages 40a, 50a thereby to supply the wheel cylinder WCrl, WCrr and WCfr, WCfl side with the brake fluid.

The brake ECU 17 is structured such that the detection signals from the wheel speed sensors Sfl, Srr, Sfr and Srl which are provided at the respective vehicle wheels Wfl, Wrr, Wfr and Wrl are inputted thereto. The brake ECU 17 calculates the wheel speed of the respective wheels, a presumed vehicle speed and the slip ratio, etc., based on the detection signals from the wheel speed sensors Sfl, Srr, Sfr and Srl. The brake ECU 17 executes anti-skid control based on the calculation result.

Various controls using the actuator 16 are executed at the brake ECU 17. For example, the brake ECU 17 outputs the control current that controls the various control valves 41, 42, 44, 45, 51, 52, 54 and 55 and the motor 47 which drives pumps provided in the actuator 16 to control the hydraulic pressure circuit in the actuator 16 to thereby independently control the respective wheel cylinder pressure transmitted to the wheel cylinders WCrl, WCrr, WCfr and WCfl. For example, the brake ECU 17 executes the anti-skid control which prevents the wheels from locking by executing pressure decreasing, pressure increasing and holding operations when the vehicle wheels are about to slip in a braking operation, or executes a stability control (sideslip prevention control) which turns the vehicle with an ideal locus by suppressing the sideslip tendency (under steer or over steer tendency) by automatically pressurizing the wheel cylinder pressure of the control subject wheel.

Figure 2:
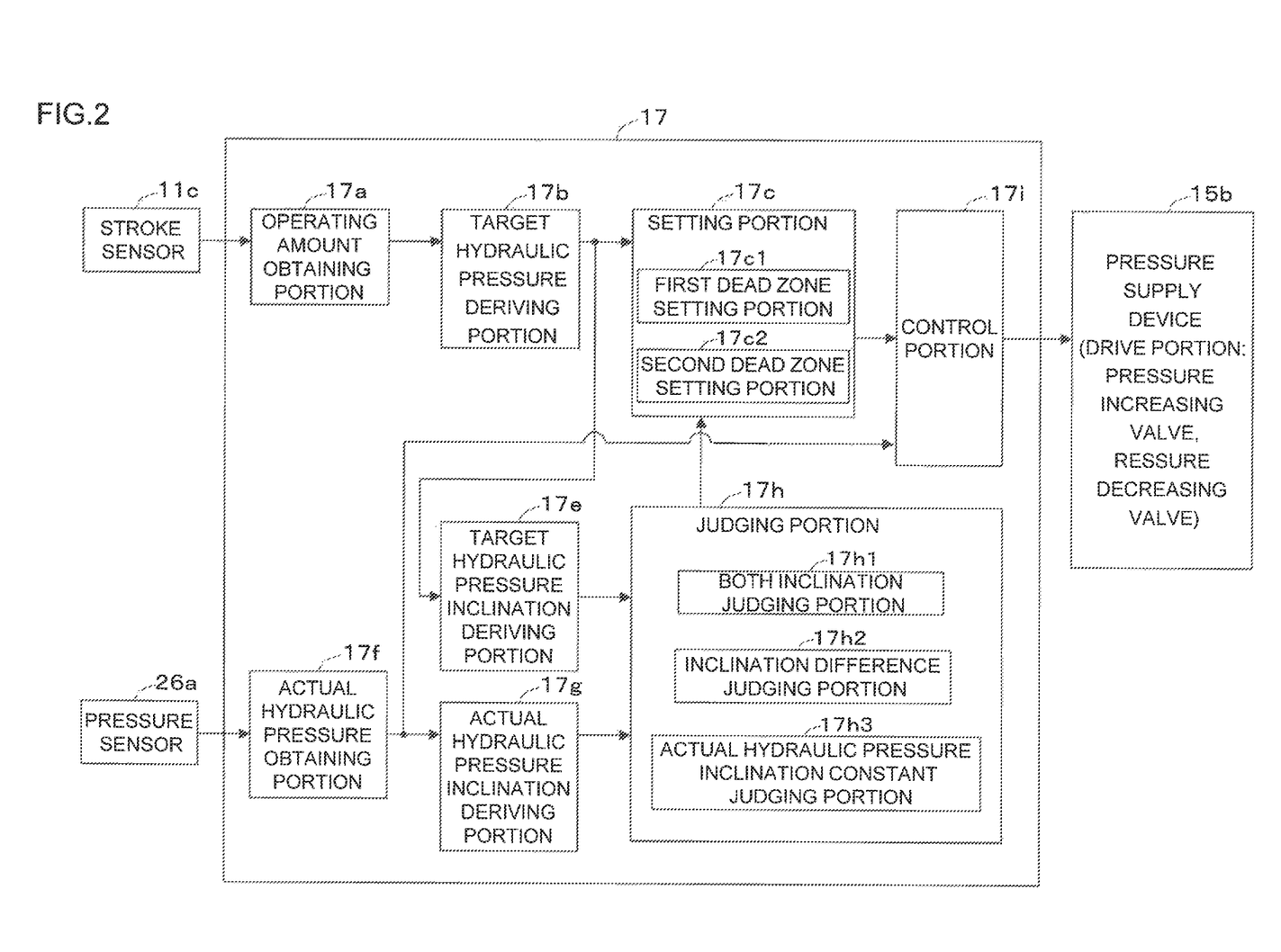
FIG. 2 is a block diagram of brake ECU indicated in FIG. 1.

The brake ECU 17 includes an operating amount obtaining portion 17a, a target hydraulic pressure deriving portion 17b, a setting portion 17c, a target hydraulic pressure inclination deriving portion 17e, an actual hydraulic pressure obtaining portion 17f, an actual hydraulic pressure inclination deriving portion 17g, a judging portion 17h and a control portion 17i.

In order to control the physical quantity (for example, servo pressure) associated with the braking force to be applied to the vehicle wheel to be the target value (target hydraulic pressure), the brake ECU 17 performs the following control which makes the actual value (actual hydraulic pressure) of physical quantity follow the target value when the actual value of physical quantity is the value outside the dead zone and performs the suppression control which suppresses the change of the actual value when the actual value is the value within the dead zone.

The operating amount obtaining portion 17a obtains the operating amount of the brake pedal 11 (operating amount associated with the brake operation: stroke) from the stroke sensor 11c. It is noted that the operating amount obtaining portion 17a may obtain an operating force detected by a sensor which directly detects the operating force (depression force) acting on the brake pedal 11, instead of obtaining the operating amount of the brake pedal 11.

The target hydraulic pressure deriving portion 17b obtains the stroke from the operating amount obtaining portion 17a and derives the operating state (for example, stroke) of the brake operating member or in response to a demand from other system. The target hydraulic pressure corresponds to the target value of the physical quantity associated with the braking force to be applied to the vehicle wheel and for example, corresponds to the control target of the servo pressure. Further, the target hydraulic pressure may be a control target of the master cylinder pressure. (In such case, it is preferable to additionally provide a pressure sensor which detects the master cylinder pressure). For example, the target hydraulic pressure deriving portion 17b comprises a map which indicates the correlation between the stroke and the target hydraulic pressure, and derives the target hydraulic pressure from such map. Regarding the above mentioned other system, for example, a pre-crash system can be applicable, which prevents the collision of the vehicle by automatically generating the braking force when the vehicle is detected to be in a high risk of collision.

The setting portion 17c sets a second upper limit threshold value, as the upper limit threshold value Pu, when the actual value is judged to pass through the dead zone by the judging portion 17h. The second upper limit threshold value is approximated to the target hydraulic pressure more closely than a first upper limit threshold value which is the upper limit threshold value Pu set when the actual hydraulic pressure is judged not to pass through the dead zone by the judging portion 17h.

The setting portion 17c includes a first dead zone setting portion 17c1 and a second dead zone setting portion 17c2.

The first dead zone setting portion 17c1 obtains the target hydraulic pressure from the target hydraulic pressure deriving portion 17b and sets the dead zone to the first dead zone from the obtained target hydraulic pressure. The first dead zone setting portion 17c1 is a first setting portion which sets the dead zone lower limit threshold value Pl as the first lower threshold value and at the same time sets the dead zone upper limit threshold value Pu as the first upper threshold value when the actual hydraulic pressure is judged to not pass through the dead zone by the judging portion 17h (normal operation). The lower limit threshold value Pl is the threshold value at which the pressure increasing control which increases the actual hydraulic pressure starts. The upper limit threshold value Pu is the threshold value at which the pressure decreasing control which decreases the actual hydraulic pressure starts. The dead zone is a pressure range in which the pressure increasing valve 15b7 and the pressure decreasing valve 15b6 are closed (suppression control which will be explained later) when the actual hydraulic pressure is within the dead zone.

The second dead zone setting portion 17c2 obtains the target hydraulic pressure from the target hydraulic pressure deriving portion 17b and sets the dead zone to the second dead zone from the obtained target hydraulic pressure. The second dead zone setting portion 17c2 sets a second upper limit threshold value which is approximated to the target hydraulic pressure, more closely than the first upper limit threshold value, as the upper limit threshold value Pu, when the actual hydraulic pressure is judged to pass through the dead zone by the judging portion 17h, while the target hydraulic pressure is increasing.

Further, the second dead zone setting portion 17c2 sets the second lower limit threshold value which is approximated to the target hydraulic pressure more closely than the first lower limit threshold value which is the lower limit threshold value Pl set when the actual hydraulic pressure is judged to not pass through the dead zone by the judging portion 17h as the lower limit threshold value Pl, when the actual hydraulic pressure is judged to pass through the dead zone by the judging portion 17h while the target hydraulic pressure is decreasing.

It is noted that the second dead zone setting portion 17c2 may set the lower limit threshold value Pl in addition to the upper limit threshold value Pu to the second lower limit threshold value which is the value approximated to the target hydraulic pressure more closely than the first lower limit threshold value, when the actual hydraulic pressure is judged to pass through the dead zone by the judging portion 17h while the target hydraulic pressure is increasing. Further, this is the same as the case when the actual hydraulic pressure is judged to pass through the dead zone and while the target hydraulic pressure is decreasing.

The setting portion 17c executes the dead zone change explained above (at least one of the change from the first upper limit threshold value to the second upper limit threshold value and the change from the first lower limit threshold value to the second lower limit threshold value) under the condition that the change amount of the target hydraulic pressure per unit time (inclination of the target hydraulic pressure) is smaller than the first judging value. In other words, the setting portion 17c does not execute the change of the dead zone as explained above when the change amount of the target hydraulic pressure per unit time is equal to or more than the first judging value even when the actual hydraulic pressure is judged to pass through the dead zone by the judging portion 17h. In more detail, the setting portion 17c obtains the target hydraulic pressure inclination from the both inclination judging portion 17h1 which will be explained later, and sets the upper limit threshold value Pu which has been the first upper limit threshold value as the second upper limit threshold value, when the target hydraulic pressure is increasing and when the target hydraulic pressure inclination is smaller than the first judging value and sets the lower limit threshold value Pl which has been the first lower limit threshold value as the second upper limit threshold value, when the target hydraulic pressure is decreasing and when the target hydraulic pressure inclination is smaller than the first judging value. It is noted here that the change amount of the target hydraulic pressure per unit time is preferably set to the absolute value.

Further, when the target hydraulic pressure inclination is greater than the second judging value, the setting portion 17c executes at least one of the change operation from the second upper limit threshold value to the first upper limit threshold value and the change operation from the second lower limit threshold value to the first lower limit threshold value. It is noted that the second judging value is set to be greater than the first judging value. According to this operation, an occurrence of control hunting phenomenon upon the change operation from the second upper limit threshold value to the first upper limit threshold value and the change operation from the second lower limit threshold value to the first lower limit threshold value can be suppressed.

The target hydraulic pressure inclination deriving portion 17e derives the inclination of the target hydraulic pressure (target hydraulic pressure inclination) from the target hydraulic pressure obtained from the target hydraulic pressure deriving portion 17b. In more detail, the target hydraulic pressure inclination deriving portion 17e derives the target hydraulic pressure inclination from a plurality of target hydraulic pressures obtained every control cycle and the control cycle.

The actual hydraulic pressure obtaining portion 17f obtains the servo pressure (actual hydraulic pressure in the hydraulic pressure: actual value of the hydraulic pressure in the hydraulic pressure chamber) in the output chamber R12 (and servo chamber R5) from the pressure sensor 26a. The servo pressure obtained by the actual hydraulic pressure obtaining portion 17f is outputted to the control portion 17i and the actual hydraulic pressure inclination deriving portion 17g.

The actual hydraulic pressure inclination deriving portion 17g derives the inclination of the actual hydraulic pressure (actual hydraulic pressure inclination) from the actual hydraulic pressure obtained from the actual hydraulic pressure obtaining portion 17f. In more detail, the actual hydraulic pressure inclination deriving portion 17g derives the actual hydraulic pressure inclination from the plurality of actual hydraulic pressures obtained every control cycle and the control cycle.

The judging portion 17h judges whether or not the actual hydraulic pressure passes through the dead zone with a value beyond the upper limit threshold value Pu during the increasing operation of the target hydraulic pressure and judges whether or not the actual hydraulic pressure passes through the dead zone with a value below the lower limit threshold value Pl during the decreasing operation of the target hydraulic pressure. In more detail, the judging portion 17h judges whether or not the actual hydraulic pressure passes through the dead zone by obtaining the target hydraulic pressure inclination from the target hydraulic pressure inclination deriving portion 17e and obtaining the actual hydraulic pressure inclination from the actual hydraulic pressure inclination deriving portion 17g, and using at least one of both hydraulic pressure inclinations.

For example, the judging portion 17h includes a both inclination judging portion 17h1, an inclination difference judging portion 17h2 and an actual hydraulic pressure inclination constant judging portion 17h3.

The both inclination judging portion 17h1 judges that the actual hydraulic pressure passes through the dead zone (judges that the dead zone has to be changed to the second dead zone), when the change amount of the target hydraulic pressure per unit time (target hydraulic pressure inclination) is smaller than the first judging value and at the same time the change amount of the actual hydraulic pressure per unit time (actual hydraulic pressure inclination) is greater than the change amount of the target hydraulic pressure and also greater than the second judging value. The inclination difference judging portion 17h2 judges that the actual hydraulic pressure passes through the dead zone when the difference in change amount (inclination difference) between the change amount of the target hydraulic pressure per unit time (target hydraulic pressure inclination) and the change amount of the actual hydraulic pressure per unit time (actual hydraulic pressure inclination) is greater than the third judging value. The actual hydraulic pressure inclination constant judging portion 17h3 judges that the actual hydraulic pressure passes through the dead zone when the state that the actual hydraulic pressure is constant continues for a predetermined time period during the increasing or decreasing operation of the target value. In any of the judging portions, such detection is made in a case where the depression speed of the brake pedal 11 or the releasing speed thereof is relatively slow and accordingly in a case where the change of the actual hydraulic pressure generated stepwise in the dead zone is easily transmitted to the driver of the vehicle.

The judging portion 17h judges that the actual hydraulic pressure does not pass through the dead zone when the difference in the change amount (inclination difference) between the target hydraulic pressure inclination and the actual hydraulic pressure inclination is smaller than the fourth judging value. The fourth judging value is set to a value smaller than the third judging value. Thus, the occurrence of control hunting phenomenon upon returning the dead zone from the second dead zone to the first dead zone.

It is preferable that the judging portion 17h sets a returning judging value which is a value different from the judging value upon switching over the dead zone from the first dead zone to the second dead zone, when the dead zone is returned (switched over) from the second dead zone to the first dead zone.

For example, the first returning judging value which is greater than the firs judging value and the second returning judging value which is smaller than the second judging value are set. Then, the both inclination judging portion 17h1 judges that it is necessary to change the dead zone of the second dead zone to the first dead zone when the change amount of the target hydraulic pressure (target hydraulic pressure inclination) is greater than the first returning judging value and the change amount of the actual hydraulic pressure (actual hydraulic pressure inclination) is smaller than the change amount of the target hydraulic pressure and is smaller than the second returning judging value.

Further, the third returning judging value which is smaller than the third judging value is set. Then, the inclination difference judging portion 17h2 judges that it is necessary to change the dead zone of the second dead zone to the first dead zone when the change amount difference (inclination difference) between the change amount of the target hydraulic (target hydraulic pressure inclination) and the change amount of the actual hydraulic pressure (actual hydraulic pressure inclination) is smaller than the third returning judging value. The actual hydraulic pressure constant judging portion 17h3 judges that it is necessary to change the dead zone of the second dead zone to the first dead zone when the state that the actual hydraulic pressure is constant continues for a returning predetermined time which is shorter than the predetermined time.

Thus, the occurrence of control hunting phenomenon upon returning the dead zone from the second dead zone to the first dead zone.

The control portion 17i obtains the first dead zone and/or the second dead zone from the setting portion 17c (obtains the first dead zone from the first dead zone setting portion 17c1 and obtains the second dead zone from the second dead zone setting portion 17c2) and obtains the actual hydraulic pressure from the actual hydraulic pressure obtaining portion 17f, and executes the suppression control which suppresses the change of the actual hydraulic pressure when the actual hydraulic pressure is within the dead zone and executes the following control which controls the actual hydraulic pressure to make follow the target hydraulic pressure when the actual hydraulic pressure is outside the dead zone.

In the following control, the pressure increasing control starts to increase the actual hydraulic pressure when the actual hydraulic pressure falls below the lower limit threshold value Pl. In other words, the pressure increasing valve 15b7 is opened and the pressure decreasing valve 15b6 is closed. Further, the following control starts the pressure decreasing control to decrease the actual hydraulic pressure when the actual hydraulic pressure exceeds the upper limit threshold value Pu. In other words, the pressure increasing valve 15b7 is closed and the pressure decreasing valve 15b6 is opened.

In the suppression control, the pressure increasing valve 15b7 is closed (in this timing, the pressure decreasing valve 15b6 is in a closed state) when the actual hydraulic pressure exceeds the lower limit threshold value Pl during the pressure increasing control and the pressure decreasing valve 15b6 is closed (in this timing, the pressure increasing valve 15b7 is in a closed state) when the actual hydraulic pressure falls below the upper limit threshold value Pu during the pressure decreasing control. The suppression control is the control in which the pressure decreasing valve 15b6 and the pressure increasing valve 15b7 are closed during the holding control where the hydraulic pressure in the hydraulic pressure chamber is kept constant.

Further, the control portion 17i obtains the judgement of whether the dead zone is necessary to be changed or not from the judging portion 17h and in response to the judgement, changes the dead zone to the first dead zone or the second dead zone. When the change of the dead zone to the first dead zone is judged to be necessary (i.e., when the change of the dead zone to the second dead zone is judged to be not necessary), the control portion 17i executes the above explained suppression control after changing the dead zone to the first dead zone. The control portion 17i also executes the above explained following control and suppression control when the change of the dead zone to the second dead zone is judged to be necessary after changing the dead zone to the second dead zone.

Figure 3:
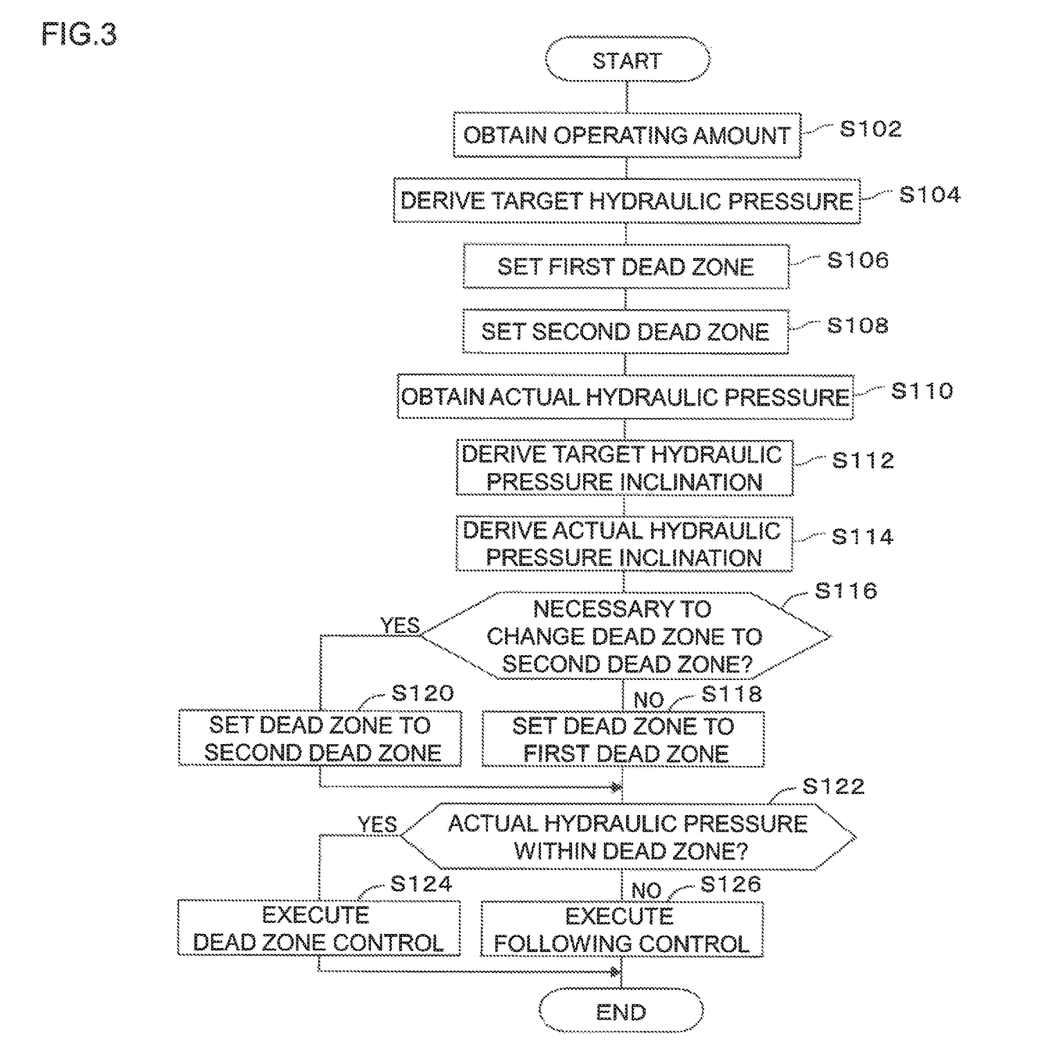
FIG. 3 is a flowchart of a control program which is executed at the brake ECU indicated in FIG. 1.

Further, the operation of the vehicle braking device will be explained with reference to the flowchart shown in FIG. 3. The brake ECU 17 executes the program along the flowchart per every predetermined short time period (control cycle).

The brake ECU 17 obtains the operating amount of the brake pedal 11 from the stroke sensor 11c at the step S102. The step S102 corresponds to the step for execution process by the operating amount obtaining portion 17a, as explained above. It is noted here that as an alternative way, at the step S102, the required braking force (or the required deceleration) may be obtained from other systems such as for example, a pre-crash system in which a collision is prevented by generating automatically the braking force when the system detects a high risk of collision.

At the step S104, the brake ECU 17 derives the target hydraulic pressure in response to the operating amount (stroke) or the required braking force from other system. The step S104 corresponds to the step for execution process by the target hydraulic pressure deriving portion 17b, as explained above.

At the step S106, the brake ECU 17 derives (sets) the first dead zone from the target hydraulic pressure derived at the step S104. The step S106 corresponds to the step for execution process by the first dead zone setting portion 17c1, as explained above.

At the step S108, the brake ECU 17 derives (sets) the second dead zone from target hydraulic pressure derived at the step S104. The step S108 corresponds to the execution process by the second dead zone setting portion 17c2, as explained above.

The brake ECU 17 obtains the servo pressure which is the actual hydraulic pressure from the pressure sensor 26a at the step S110. The step S110 corresponds to the execution process by the actual hydraulic pressure obtaining portion 17f, as explained above.

At the step S112, the brake ECU 17 derives the target hydraulic pressure inclination from the target hydraulic pressure derived at the step S104. The step S112 corresponds to the execution process by the target hydraulic pressure inclination deriving portion 17e, as explained above.

At the step S114, the brake ECU 17 derives the actual hydraulic pressure inclination from the actual hydraulic pressure obtained at the step S110. The step S114 corresponds to the step for execution process by the actual hydraulic pressure inclination deriving portion 17g, as explained above.

At the step S116, the brake ECU 17 judges whether the change of the dead zone is necessary or not from at least one of the changes of the target hydraulic pressure and the actual hydraulic pressure. In more detail, the brake ECU 17 judges whether the change of the dead zone to the second dead zone is necessary or not from the target hydraulic pressure inclination derived at the step S112 and the actual hydraulic pressure inclination derived at the step S114. The step S116 corresponds to the step for execution process by the judging portion 17h as explained above. When the change of the dead zone is judged to be not necessary, the brake ECU 17 advances the program to the step S118 and sets the dead zone to the previously derived first dead zone. When the change of the dead zone is judged to be necessary, the brake ECU 17 advances the program to the step S120 and sets the dead zone to the previously derived second dead zone.

At the step S122, the brake ECU 17 judges whether or not the actual hydraulic pressure obtained at the step S110 is within the dead zone which has been set at the step S118 or S120. When the actual hydraulic pressure is within the dead zone, the brake ECU 17 advances the program to the step S124 and when the actual hydraulic pressure is not within the dead zone, advances the program to the step S126.

At the step S124, the brake ECU 17 executes the suppression control as explained above and executes at the step S126 the following control.

Figure 4:
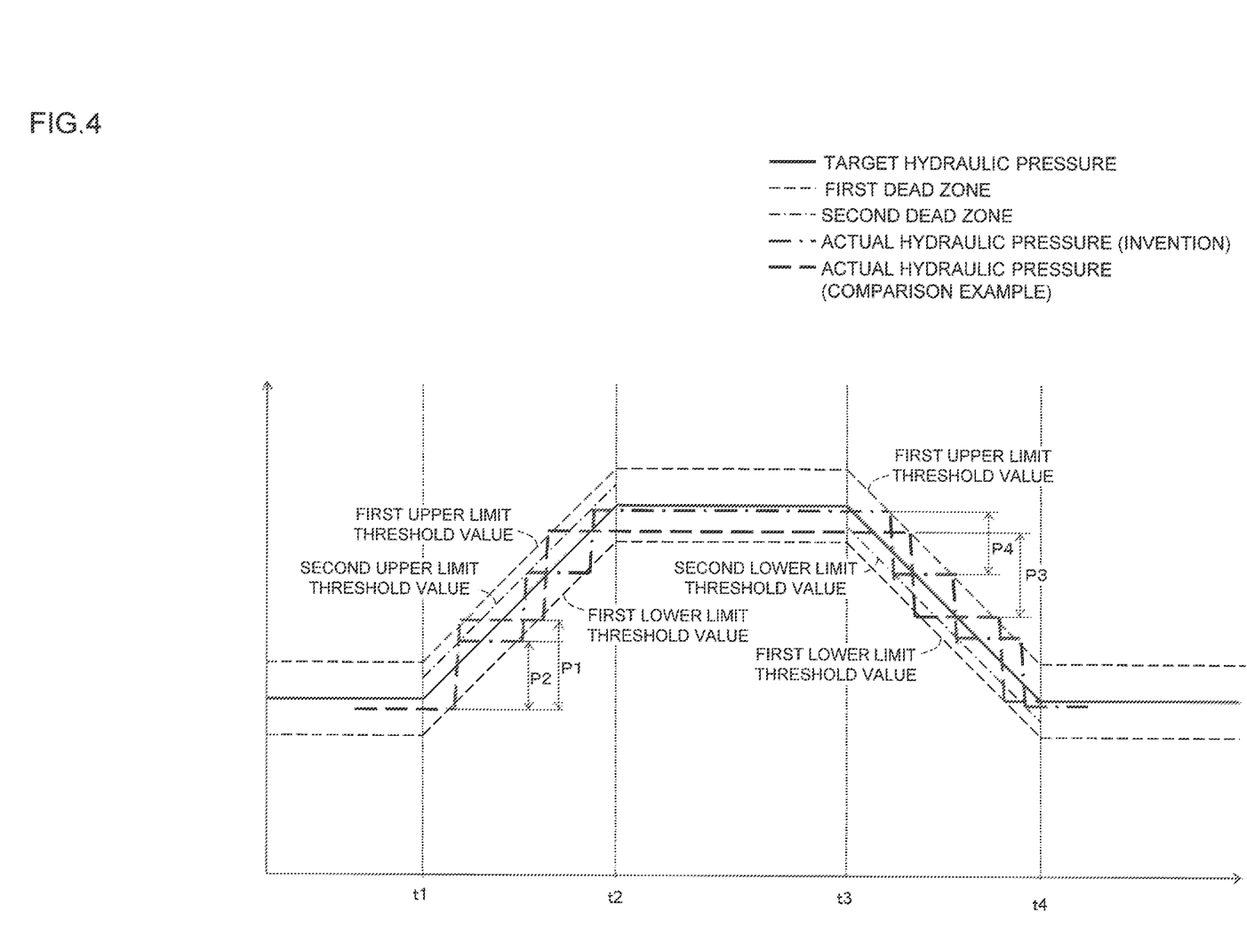
FIG. 4 is a time chart which indicates the operation of the vehicle braking device of the invention.

The operation of the vehicle braking device explained above will be explained with reference to the time chart shown in FIG. 4.

At the time t1, the depression of the brake pedal 11 starts. During the time period from the time t1 to the time t2 (the target hydraulic pressure is increasing), the brake pedal 11 is under depression state and during the time period from the time t2 to the time t3, the brake pedal 11 is held to a predetermined operating amount (the target hydraulic pressure is being held). Further, at the time t3, releasing operation of the brake pedal 11 starts. During the time period from the time t3 to the time t4 (the target hydraulic pressure is decreasing), the brake pedal 11 is under releasing and after the time t4, the brake pedal 11 is in a released state (the state that brake pedal is not in depression).

It is noted that the bold solid line indicates the target hydraulic pressure, the fine broken line indicates the first dead zone, the fine dot-chain line indicates the second dead zone, the bold dot-chain line indicates the actual hydraulic pressure associated with the invention and the bold broken line indicates the actual hydraulic pressure associated with a comparative example.

In the comparison example, while the target hydraulic pressure is increasing, the dead zone is set to the first dead zone, and accordingly, the actual hydraulic pressure is increased by the amount P1 until it reaches to the first upper limit threshold value after it falls below the lower limit threshold value.

To these comparison examples, according to the invention, while the target hydraulic pressure is increasing, the dead zone is set to the second dead zone and particularly the upper limit threshold value is set to the second upper limit threshold value which is a value more closely approximated to the target hydraulic pressure than the first upper limit threshold value. Accordingly, the actual hydraulic pressure is increased by the amount P2 which is smaller than the amount P1 until it reaches to the second upper limit threshold value after it falls below the first lower limit threshold value. In other words, comparing with the normal situation (when the actual value is judged to not pass through the dead zone), the decreasing of the actual hydraulic pressure starts in an early stage to suppress the change amount (increasing amount) of the actual hydraulic pressure as small as possible. This can eventually lead to the suppression of the stepwise change of the actual hydraulic pressure.

The above explanation to the pressure increasing control is similar to the pressure decreasing control and according to the invention, while the target hydraulic pressure is decreasing, the dead zone is set to the second dead zone and particularly the lower limit threshold value is set to the second lower limit threshold value which is more closely approximated to the target hydraulic pressure than the first lower limit threshold value. Accordingly, the actual hydraulic pressure is decreased by the amount P4 which is smaller than the amount P3 until it reaches to the second lower limit threshold value after it exceeds above the first upper limit threshold value. In other words, comparing with the normal situation (when the actual value is judged to not pass through the dead zone), the increasing of the actual hydraulic pressure starts in an early stage to suppress the change amount (decreasing amount) of the actual hydraulic pressure as small as possible. This can eventually lead to the suppression of the stepwise change of the actual hydraulic pressure. It is noted here that the amount P3 is the decreasing amount of the actual hydraulic pressure when the lower limit threshold value is the first lower limit threshold value (under normal operation).

As apparent from the explanation above, in order to control the servo pressure (physical quantity) associated with the braking force to be applied to the vehicle wheel to be the target hydraulic pressure (target value) of the servo pressure (physical quantity), assuming that the dead zone is defined to be a value between a lower limit threshold value which is smaller than the target hydraulic pressure and an upper limit threshold value which is greater than the target hydraulic pressure, the vehicle braking device associated with the embodiment performs a following control which makes an actual hydraulic pressure follow the target hydraulic pressure when the actual hydraulic pressure (actual value of the physical quantity) is a value outside the dead zone and a suppression control which suppresses a change of the actual hydraulic pressure when the actual hydraulic pressure is a value within the dead zone. The vehicle braking device includes a judging portion 17h which judges whether or not the actual hydraulic pressure (actual value) passes through the dead zone with a value beyond the upper limit threshold value Pu while the target hydraulic pressure (target value) is increasing and a setting portion 17c which sets a second upper limit threshold value which is approximated to the target hydraulic pressure more closely than a first upper limit threshold value which is the upper limit threshold value Pu set when the actual value is judged not to pass through the dead zone by the judging portion 17h, as the upper limit threshold value Pu, when the actual hydraulic pressure is judged to pass through the dead zone by the judging portion 17h.

Therefore, the vehicle braking device according to the embodiment, sets the second upper limit threshold value which is approximated to the target hydraulic pressure more closely than the first upper limit threshold value which is the upper limit threshold value Pu set when the actual value is judged not to pass through the dead zone (for example, at normal operation), as the upper limit threshold value Pu (i.e., at which the threshold value starts actual hydraulic pressure decreasing control), when the target hydraulic pressure is increasing and the actual hydraulic pressure is judged to pass through the dead zone with the value beyond the upper limit threshold value Pu. Therefore, the decreasing control of the actual hydraulic pressure starts in an early stage compared with the time when the normal operation to suppress the change amount (increasing amount) of the actual hydraulic pressure small as possible. Thus, the stepwise change of the actual hydraulic pressure can be suppressed and accordingly, it becomes possible to propose a vehicle braking device which can suppress an uncomfortable feeling which driver of the vehicle feels at the braking operation.

Further, the judging portion 17h judges whether or not the actual value passes through the dead zone with a value below the lower limit threshold value Pl while the target value is decreasing and when the actual value is judged to pass through the dead zone by the judging portion 17h, the setting portion 17c sets the second lower limit threshold value which is approximated to the target value more closely than the first lower limit threshold value, as the lower limit threshold value Pl.

Therefore, the vehicle braking device according to the embodiment, changes lower limit threshold value (i.e., by which the actual hydraulic pressure increasing control starts) of the dead zone to the second lower limit threshold value which is approximated to the target hydraulic pressure more closely than the first lower limit threshold value set when the actual hydraulic pressure is judged to not pass through the dead zone (for example, at normal control), when the target hydraulic pressure is decreasing and the actual hydraulic pressure is judged to pass through the dead zone. Therefore, the increasing control of the actual hydraulic pressure starts in an early stage compared with the time when the normal operation to suppress the change amount (decreasing amount) of the actual hydraulic pressure as small as possible. Thus, the stepwise change of the actual hydraulic pressure can be suppressed.

Further, the setting portion 17c executes the change control of the dead zone when the actual hydraulic pressure is judged to pass through the dead zone by the judging portion 17h and the change amount of the target hydraulic pressure per unit time is smaller than the first judging value.

Accordingly, the change of the dead zone to the second dead zone can be surely performed.

Further, the judging portion 17h judges that the actual value passes through the dead zone when the change amount difference which is the difference in change amount between the change amount of the target hydraulic pressure per unit time and the change amount of the actual hydraulic pressure per unit time is greater than the third judging value, while the target hydraulic pressure is increasing or decreasing.

Accordingly, the judgement of whether the change of the dead zone to the second dead zone is necessary or not can be surely performed.

Still further, the judging portion 17h judges that the actual hydraulic pressure does not pass through the dead zone when the change amount difference which is the difference in change amount between the change amount of the target hydraulic pressure per unit time and the change amount of the actual value per unit time is smaller than the fourth judging value, while the target hydraulic pressure is increasing or decreasing. The fourth judging value is set to be smaller than the third judging value.

Accordingly, the control hunting can be suppressed.

Further, the judging portion 17h judges that the actual hydraulic pressure passes through the dead zone when the state that the actual hydraulic pressure is held constant continues for a predetermined time, while the target value is increasing or decreasing. Accordingly, the judgement of whether the change of the dead zone to the second dead zone is necessary or not can be surely performed.

As explained, in the embodiment, the invention is applied to a hydraulic pressure type booster, however, the invention is also applicable to the electric booster which includes an electric motor etc., as the drive source to boost the operating force applied to the brake operating member.

REFERENCE SIGNS LIST

11; brake pedal, 12: master cylinder, 13; stroke simulator portion, 14; reservoir, 15; booster mechanism (hydraulic pressure generating device), 15a; regulator, 15b; pressure supply device (drive portion), 15b1; reservoir (low pressure source), 15b2; accumulator (high pressure source), 15b6; pressure decreasing valve (pressure decreasing electromagnetic valve), 15b7; pressure increasing valve (pressure increasing electromagnetic valve), 16; actuator, 17; brake ECU, 17a; operating amount obtaining portion, 17b; target hydraulic pressure deriving portion, 17c; setting portion, 17c1: first dead zone setting portion (setting portion), 17c2; second dead zone setting portion (setting portion), 17e: target hydraulic pressure inclination deriving portion, 17f; actual hydraulic pressure obtaining portion, 17g; actual hydraulic pressure inclination deriving portion, 17h; judging portion, 17i; control portion, A; hydraulic pressure braking force generating device (vehicle braking device), WC; wheel cylinder.

The invention claimed is:

1. A vehicle braking device which performs a following control which makes an actual value of physical quantity which is associated with a braking force to be applied to a vehicle wheel follow a target value of the physical quantity when the actual value is a value outside a dead zone and a suppression control which suppresses a change of the actual value when the actual value is a value within the dead zone in order to control the physical quantity to be the target value of the physical quantity, wherein the dead zone is defined to be a value between a lower limit threshold value which is smaller than the target value and an upper limit threshold value which is greater than the target value, the vehicle braking device comprising a processor configured to:

judge whether or not the actual value passes through the dead zone with a value beyond the upper limit threshold value while the target value is increasing; and set a second upper limit threshold value which is approximated to the target value more closely than a first upper limit threshold value which is the upper limit threshold value set when the actual value is judged not to pass through the dead zone, as the upper limit threshold value, when the actual value is judged to pass through the dead zone.

2. The vehicle braking device according to claim 1, wherein:

the processor judges whether or not the actual value passes through the dead zone with a value below the lower limit threshold value while the target value is decreasing; and the processor sets a second lower limit threshold value which is approximated to the target value more closely than a first lower limit threshold value which is the lower limit threshold value set when the actual value is judged not to pass through the dead zone, as the lower limit threshold value, when the actual value is judged to pass through the dead zone.

3. The vehicle braking device according to claim 1, wherein:

the processor executes changing of the dead zone when the actual value is judged to pass through the dead zone and at the same time when a change amount of the target value per unit time is smaller than a first judging value.

4. The vehicle braking device according to claim 3, wherein:

the processor executes at least one of changing of the second upper limit threshold value to the first upper limit threshold value and changing of the second lower limit threshold value to the first lower limit threshold value, when the change amount of the target value per unit time is greater than a second judging value and wherein the second judging value is set to be greater than the first judging value.

5. The vehicle braking device according to claim 1, wherein:

the processor judges that the actual value passes through the dead zone when a change amount difference which is a difference in change amount between the change amount of the target value per unit time and a change amount of the actual value per unit time is greater than a third judging value, while the target value is increasing or decreasing.

6. The vehicle braking device according to claim 5, wherein the processor judges that the actual value does not pass through the dead zone when the change amount difference which is the difference in change amount between the change amount of the target value per unit time and the change amount of the actual value per unit time is smaller than a fourth judging value, while the target value is increasing or decreasing and wherein the fourth judging value is set to be smaller than the third judging value.

7. The vehicle braking device according claim 1, wherein the processor judges that the actual value passes through the dead zone when a state that the actual value is held constant continues for a predetermined time while the target value is increasing or decreasing.

* * * * *